United States Patent
Hackney et al.

(10) Patent No.: US 7,917,274 B2
(45) Date of Patent: Mar. 29, 2011

(54) METHOD AND APPARATUS FOR VEHICLE SWAY DETECTION AND REDUCTION

(75) Inventors: James Hackney, Ypsilanti, MI (US); Akitaka Nishio, Novi, MI (US)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 740 days.

(21) Appl. No.: 11/875,142

(22) Filed: Oct. 19, 2007

(65) Prior Publication Data

US 2009/0105906 A1    Apr. 23, 2009

(51) Int. Cl.
B60T 8/1755    (2006.01)

(52) U.S. Cl. .................................................... 701/82

(58) Field of Classification Search .............. 701/82–84
See application file for complete search history.

(56) References Cited

U.S. PATENT DOCUMENTS

| | | | |
|---|---|---|---|
| 5,172,319 A * | 12/1992 | Shiraishi et al. ............... 701/90 |
| 5,261,503 A * | 11/1993 | Yasui .............................. 180/446 |
| 5,388,658 A * | 2/1995 | Ando et al. ..................... 180/197 |
| 5,627,754 A * | 5/1997 | Asanuma et al. ................ 701/41 |
| 5,711,025 A * | 1/1998 | Eckert et al. .................... 701/83 |
| 5,747,683 A * | 5/1998 | Gerum et al. ............... 73/117.01 |
| 5,799,745 A * | 9/1998 | Fukatani ......................... 180/410 |
| 5,850,616 A * | 12/1998 | Matsuno et al. ................. 701/82 |
| 5,864,769 A * | 1/1999 | Inagaki et al. ................... 701/70 |
| 5,915,800 A * | 6/1999 | Hiwatashi et al. ............. 303/146 |
| 6,012,780 A | 1/2000 | Duvernay |
| 6,042,196 A * | 3/2000 | Nakamura et al. ................ 303/7 |
| 6,074,020 A * | 6/2000 | Takahashi et al. ............. 303/146 |
| 6,219,610 B1 * | 4/2001 | Araki ............................... 701/72 |
| 6,523,911 B1 * | 2/2003 | Rupp et al. ......................... 303/7 |
| 6,600,974 B1 * | 7/2003 | Traechtler ......................... 701/1 |
| 6,799,092 B2 * | 9/2004 | Lu et al. ............................. 701/1 |
| 6,904,350 B2 * | 6/2005 | Lu et al. ........................... 701/70 |
| 7,079,928 B2 * | 7/2006 | Lu et al. ........................... 701/38 |
| 7,272,481 B2 | 9/2007 | Einig et al. |
| 2006/0125313 A1 * | 6/2006 | Gunne et al. ....................... 303/7 |
| 2006/0129291 A1 * | 6/2006 | Lu et al. ........................... 701/36 |
| 2006/0155457 A1 * | 7/2006 | Waldbauer et al. ............. 701/72 |
| 2006/0229782 A1 * | 10/2006 | Deng et al. ...................... 701/42 |
| 2008/0059034 A1 * | 3/2008 | Lu ..................................... 701/71 |
| 2008/0172163 A1 * | 7/2008 | Englert et al. ................... 701/83 |

OTHER PUBLICATIONS

International Search Report issued Dec. 17, 2008 in corresponding International Application No. PCT/US2008/011793.

* cited by examiner

Primary Examiner — Mark Hellner
Assistant Examiner — Ari M Diacou
(74) Attorney, Agent, or Firm — Buchanan Ingersoll & Rooney PC

(57) ABSTRACT

A method of controlling a vehicle involves determining if the vehicle is swaying (e.g., if a trailer being towed by the vehicle is exerting a sway force on the vehicle), and if the vehicle is swaying, reducing a torque of an engine of the vehicle and applying independent braking forces to each wheel of the vehicle. A vehicle for controlling vehicle sway includes an engine, a plurality of wheels, a braking system configured to apply independent braking forces to each wheel, and a controller configured to control the engine and the braking system. The controller is configured to determine if the vehicle is swaying (e.g., if a trailer being towed by the vehicle is exerting a sway force on the vehicle), and if the vehicle is swaying, reducing a torque of the engine and applying independent braking forces to each wheel.

10 Claims, 7 Drawing Sheets

METHOD AND APPARATUS FOR VEHICLE SWAY DETECTION AND REDUCTION

TECHNICAL FIELD

Figure 1:
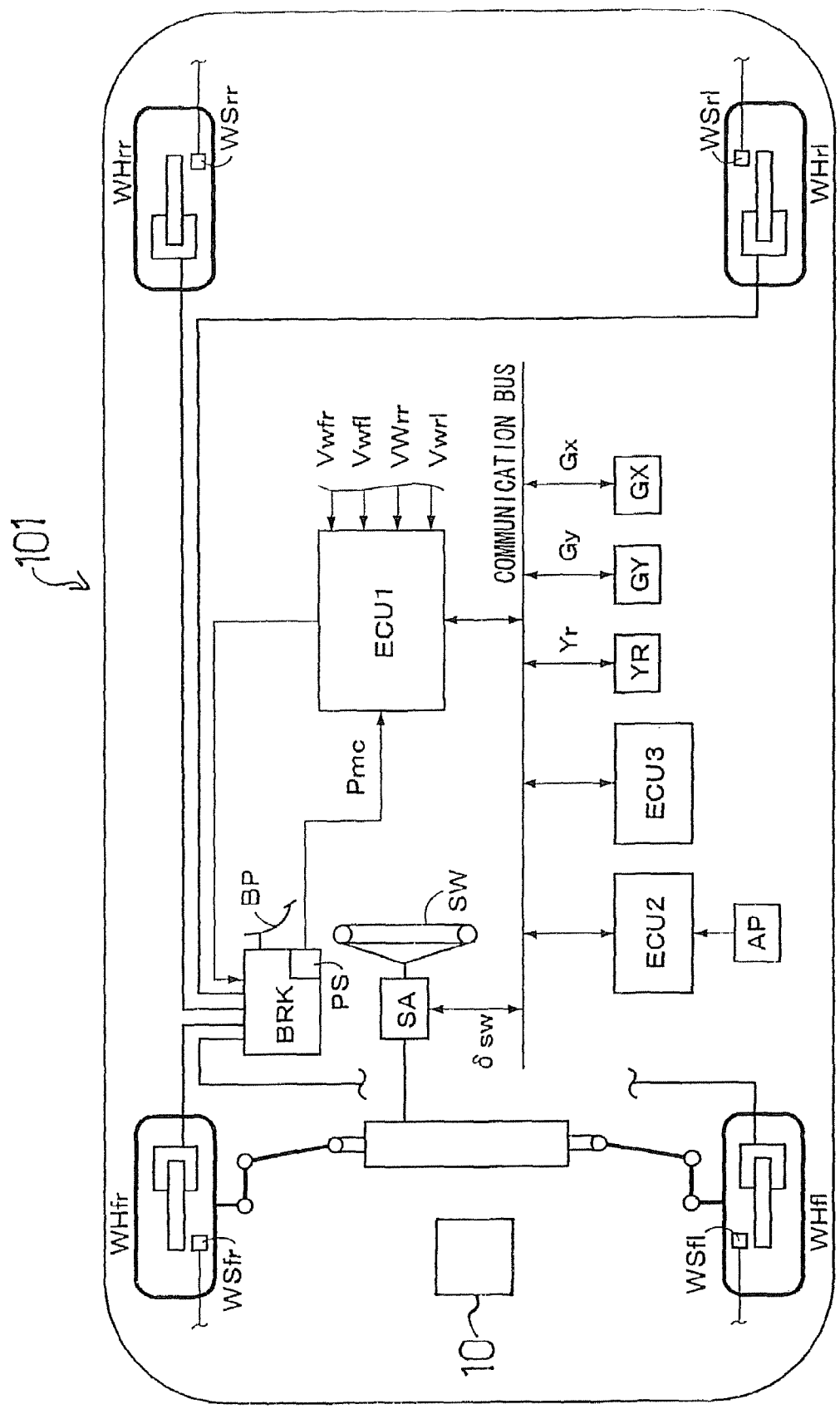

The present invention relates to a method and apparatus for detecting the sway of a vehicle. The present invention also relates to a method and apparatus for reducing the sway of a vehicle.

BACKGROUND DISCUSSION

Instances may arise when a vehicle begins to sway. Such sway can result in a variety of difficulties which should preferably be avoided. As an example, a trailer may be secured to the rear of a vehicle to be towed, for example, using a ball and receiver type hitch configuration, a pintel hook addition or the like. If the trailer becomes unstable, it oscillates laterally with a frequency and amplitude dependent on the road surface coefficient of friction and the mass of the trailer, including any payload carried by the trailer. A lateral oscillation force is then transferred to the towing vehicle through the tow hitch.

SUMMARY OF THE INVENTION

According to an embodiment of the invention, a method of controlling a vehicle comprises determining if a vehicle is experiencing sway, and if the vehicle is experiencing sway, reducing a torque of an engine of the vehicle and/or applying independent braking forces to each wheel of the vehicle.

According to another aspect, a vehicle, comprises an engine; a plurality of wheels; a braking system configured to apply independent braking forces to each wheel; and a controller configured to control the engine and the braking system, the controller being configured to determine if the vehicle is swaying; and if the vehicle is experiencing sway, reducing the torque of the engine and/or apply independent braking forces to each wheel.

BRIEF DESCRIPTION OF THE DRAWING FIGURES

Various embodiments of the method and apparatus disclosed herein will be described in relation to the attached drawings briefly discussed below in which like elements and features are designated by like reference numerals.

FIG. 1 is a schematic illustration of one example of a vehicle outfitted with the sway detection and reduction apparatus or system described herein.

Figure 2:
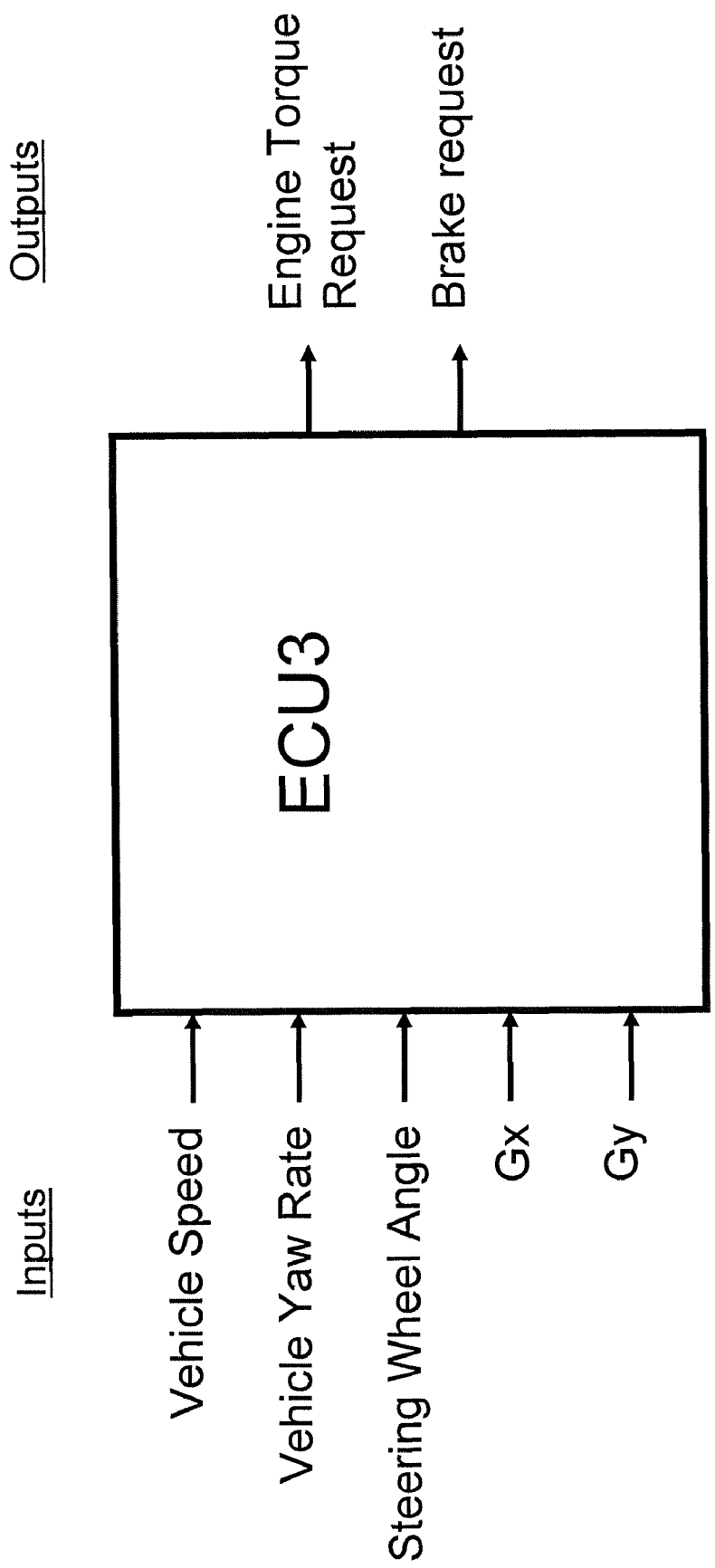

FIG. 2 schematically illustrates an embodiment of the system or apparatus for reducing the sway of a towing vehicle and a trailer as disclosed herein.

Figure 3:
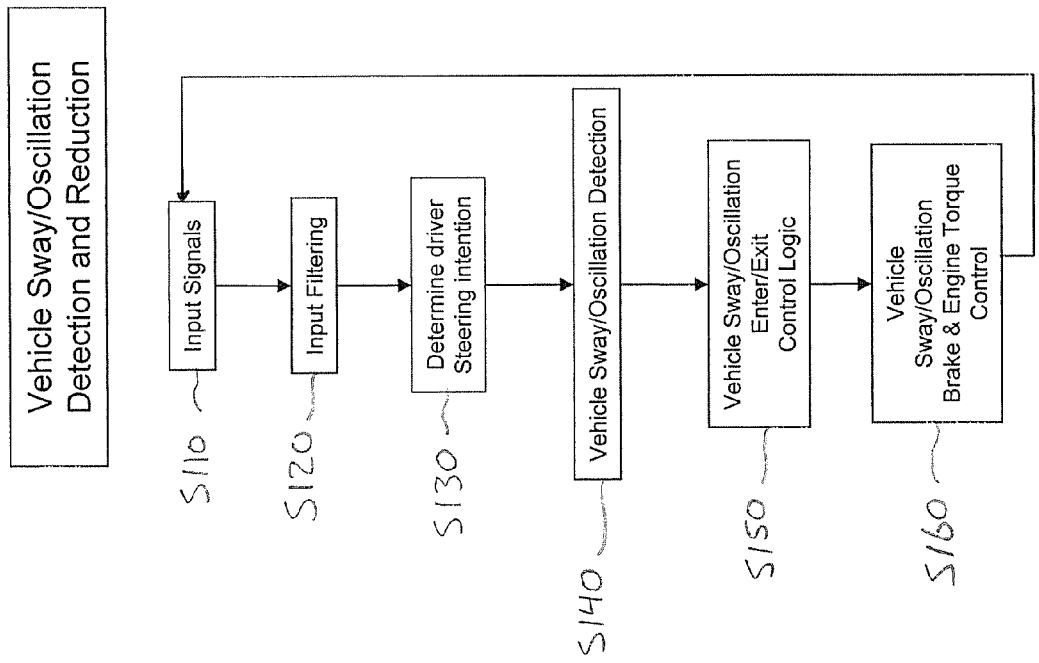

FIG. 3 is a schematic illustration of an example of a vehicle sway/oscillation detection process disclosed herein.

Figure 4:
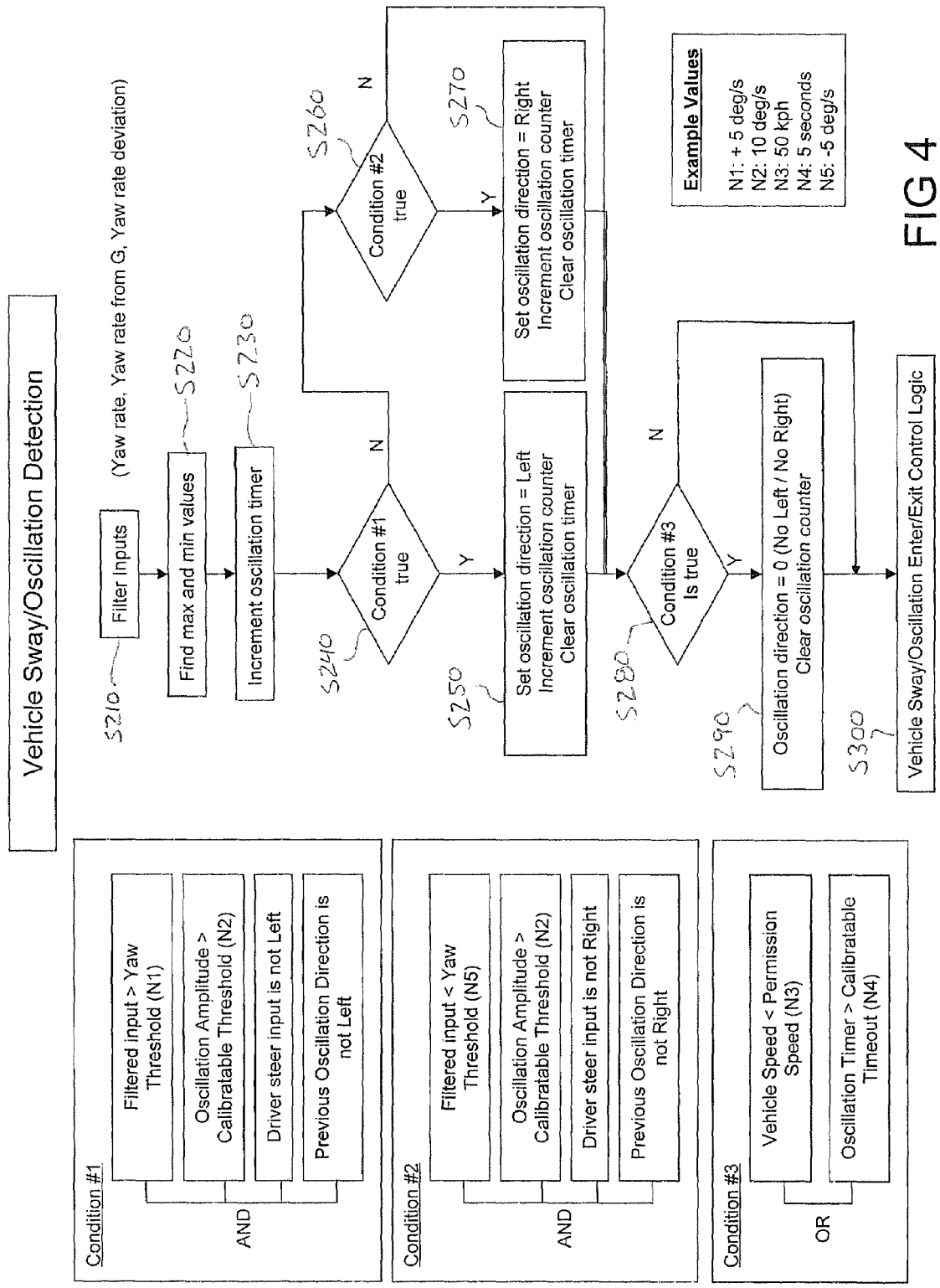

FIG. 4 schematically illustrates a vehicle sway/oscillation detection process forming a part of the vehicle sway/oscillation detection process shown in FIG. 3.

Figure 5:
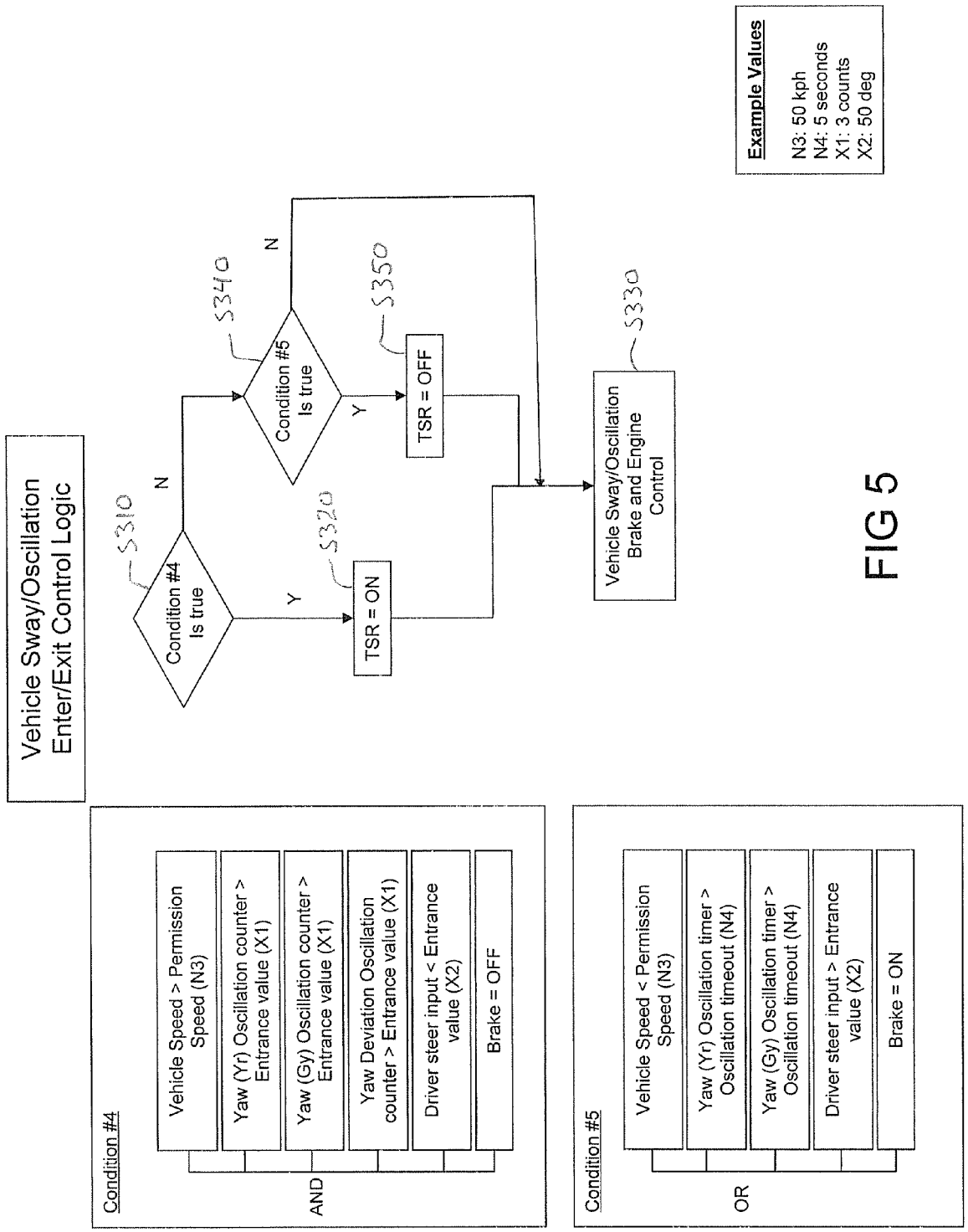

FIG. 5 schematically illustrates a vehicle sway/oscillation enter/exit control logic forming a part of the vehicle sway/oscillation detection process of FIG. 4.

Figure 6:
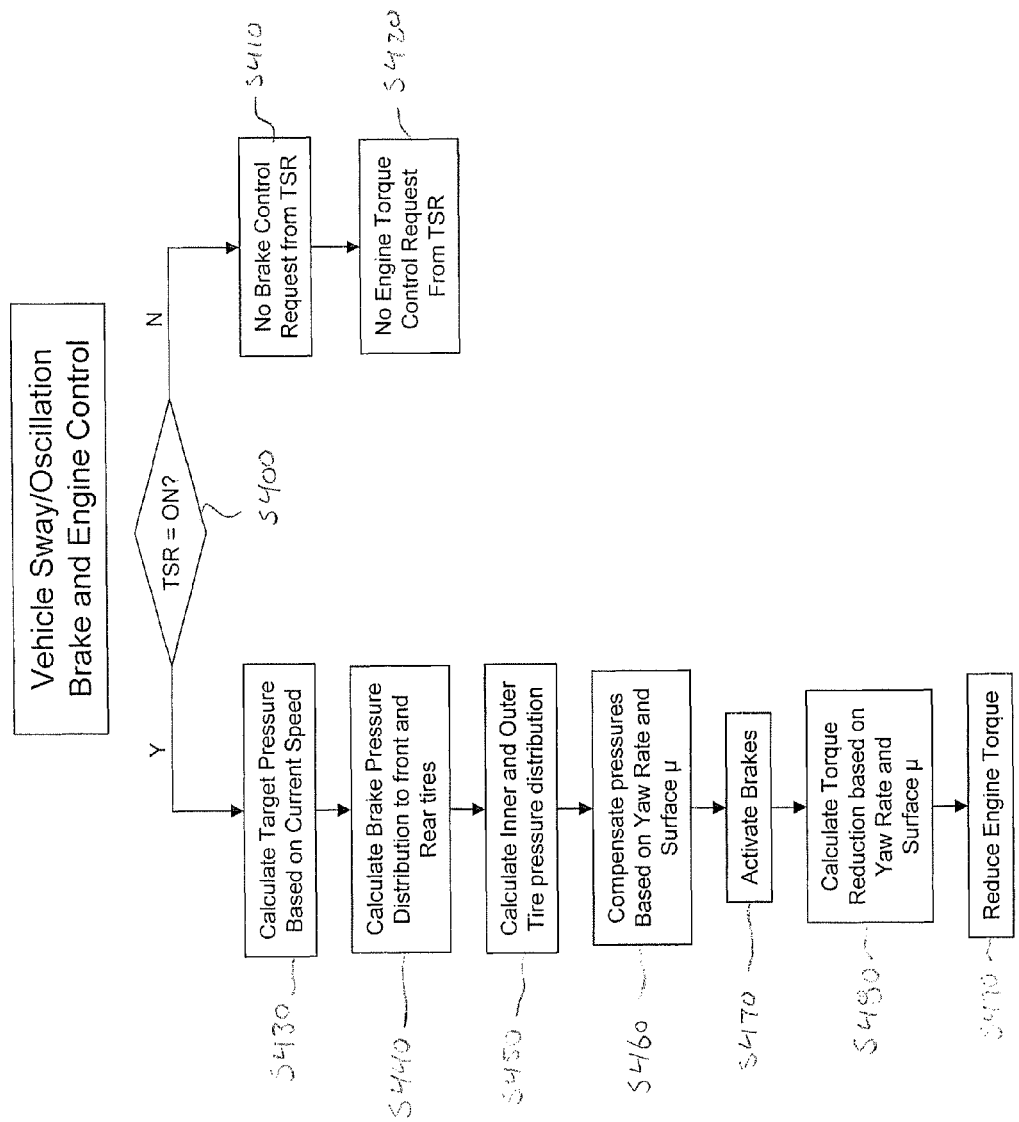

FIG. 6 schematically illustrates a vehicle sway/oscillation detection and reduction process forming a part of the vehicle sway/oscillation detection process shown in FIG. 3.

Figure 7:
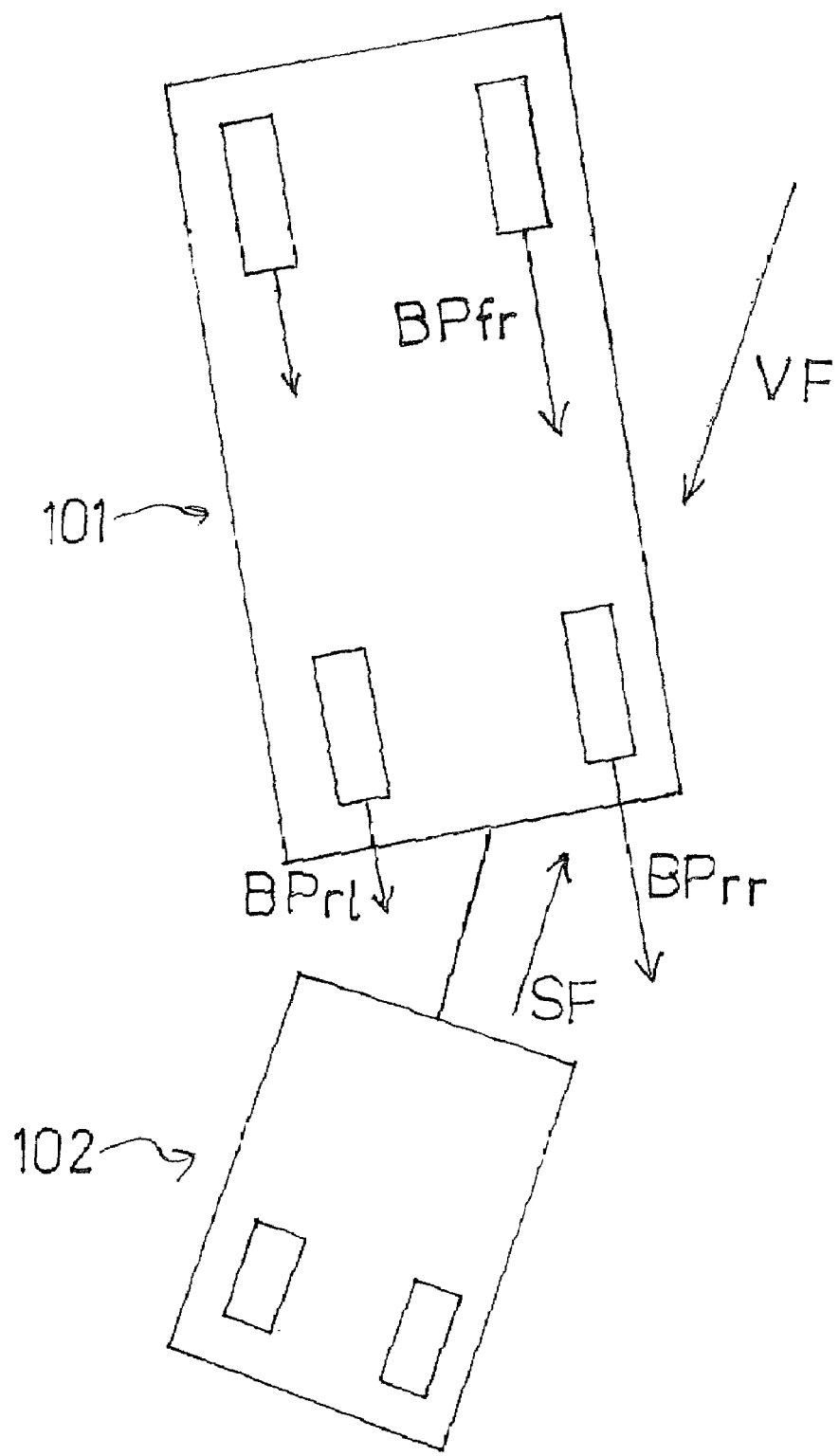

FIG. 7 schematically illustrates brake forces on a towing vehicle.

DETAILED DESCRIPTION

FIG. 1 schematically illustrates an overall structure of a vehicle 101 incorporating the vehicle sway detection and reduction mechanism disclosed here. The vehicle sway detection and reduction mechanism disclosed here has useful application in connection with a vehicle that is towing a trailer as the trailer itself may sway and thus induce sway in the vehicle towing the trailer. Thus, an embodiment of the vehicle sway detection and reduction mechanism is discussed below as used in a vehicle which is towing a trailer. However, the disclosed vehicle sway detection and reduction mechanism disclosed here is not limited in that regard as it is also applicable to the detection and reduction of vehicle sway resulting from sway-inducing influences other than a trailer. For example, instances of undesirable vehicle sway or oscillation may occur when a vehicle is towing another vehicle, in the case of a vehicle such as a flat bed truck having a relatively long wheel base, or by virtue of other sway-inducing influences on a vehicle.

A brake system electronic control unit ECU1, engine system electronic control unit ECU2, and a vehicle sway detection/reduction control unit ECU3 are connected to one another through a communication bus, so that the information for each control unit can be fed from other control units. A steering angle sensor SA detects a steering angle δsw of a steering wheel SW, a longitudinal acceleration sensor GX detects a vehicle longitudinal acceleration Gx, a lateral acceleration sensor GY detects a vehicle lateral acceleration Gy, and a yaw rate sensor YR detects a yaw rate Yr of the vehicle. Wheel speed sensors WSfr, WSfl, WSrr, WSrl are provided for each wheel WHfr, WHfl, WHrr, WHrl, respectively. These wheel speed sensors are electrically connected to each electronic control unit ECU1-ECU3, via the communication bus, to supply the sensor signals. A brake actuator BRK is actuated either in response to brake pedal operation or by the brake system ECU1 independently of brake pedal operation. The brake actuator BRK generally controls the braking force applied at each wheel, either in response to depression of the brake pedal or independently of brake pedal operation in response to a signal from the brake system ECU1. A pressure sensor PS is provided in the brake actuator BRK for detecting an amount of operation of the brake pedal BP by the vehicle driver, to feed its detected pressure Pmc to the brake system ECU1. The braking force control for the vehicle sway reduction can be performed even in the case where the vehicle driver is not operating the brake pedal BP (i.e., independent of brake pedal actuation/operation).

The vehicle 101 includes an engine 10 which may transmit information to the engine system electronic control unit ECU2 and receive commands from the engine system electronic control unit ECU2. The engine may be any internal combustion engine, an electric motor, or a hybrid internal engine/electric motor system.

As shown in FIG. 1, each wheel speed sensor provides a signal Vwfr, Vwfl, Vwrr, Vwrl having pulses proportional to a rotational speed of each wheel, i.e., a wheel speed signal is fed to the brake system electronic control unit ECU1, wherein a vehicle speed in the longitudinal direction of the vehicle is calculated on the basis of wheel speed signals fed from the wheel speed sensors. The amount of operation of an accelerator pedal (not shown) is detected by an accelerator pedal sensor AP, and fed to the engine system electronic control unit ECU2 and the brake system electronic control unit ECU1 and the vehicle sway detection/reduction electronic control unit ECU3 through the communication bus as described before.

Referring to FIG. 2, the vehicle speed, the vehicle yaw rate, the steering angle, and the lateral and longitudinal accelerations are input into the vehicle sway detection/reduction electronic control unit ECU3. The vehicle sway detection/reduction electronic control unit ECU3 outputs an engine torque request to the engine system ECU2 and a brake request to the brake system ECU1. As discussed in detail below, detecting and reducing the sway of the vehicle may be performed using the vehicle speed, the vehicle yaw rate, the vehicle longitudinal acceleration, the vehicle lateral acceleration, and the steering wheel angle as inputs to the vehicle sway detection/reduction electronic control unit ECU3. It is to be recognized that it may not be necessary to use all such inputs if, for example, a vehicle is not outfitted with one or more of a longitudinal acceleration sensor GX, a lateral acceleration sensor GY, etc.

Referring to FIG. 3, a vehicle sway detection and reduction process begins at S110 where the vehicle speed, the vehicle yaw rate, the steering wheel angle, the vehicle longitudinal acceleration and the vehicle lateral acceleration are entered as inputs into the ECU3. The process then proceeds to S120 where the inputs are filtered.

Next, at S130, the driver steering intention is determined based on the input from the steering angle sensor SA. Here, the direction of the driver's steering operation is determined, for example if the driver intends to steer in the direction of the sway. The process then proceeds to S140 where a vehicle sway/oscillation vehicle oscillation detection is performed. The vehicle oscillation or sway detection is described in more detail below with reference to FIG. 4.

The process in FIG. 3 then proceeds to S150 where, in this described embodiment involving a vehicle towing a trailer, vehicle sway/oscillation enter/exit control logic process is performed. The enter/exit control logic process is described below in more detail with reference to FIG. 6. Following S150, the process proceeds to S160 where the brake and engine torque control is performed, whereupon the process returns to S110 for the inputting of signals.

FIG. 4 illustrates the vehicle sway or oscillation detection of S140 in FIG. 3. As shown in FIG. 4, the process routine begins at S210 with the filtered inputs. The filtered inputs here include the yaw rate Yr from the yaw rate sensor YR, the vehicle lateral acceleration or yaw rate Gy from the lateral acceleration sensor GY and the yaw rate deviation. The yaw rate deviation or change in yaw rate refers to the difference between the yaw rate from steering (a function of vehicle speed, wheel base length and steering known in the art) and the actual yaw rate determined by the yaw rate sensor YR. In practice, the illustrated routine is carried out for each of the filtered inputs. At S220, the filtered input is checked to determine the maximum and minimum peak values. As discussed in more detail below, the maximum and minimum values are used to determine an oscillation amplitude which is then compared to a threshold (N2). The minimum and maximum peak values for the cycle may be stored in a memory of the ECU 3. The process then proceeds to S230 where an oscillation timer is incremented. The system preferably includes an oscillation timer for each of the three filtered inputs, and at S230, the oscillation timer for the respective filtered input is incremented. In the disclosed embodiment, the oscillation timer starts when the vehicle is turned on. The oscillation timer clears when, as discussed below, Condition #1 or Condition # 2 is met.

Next, at S240, it is determined whether Condition # 1 is true. That is, as shown in the upper left portion of FIG. 4, Condition #1 is determined to be true (S240: Yes) when all four of the noted conditions are satisfied. The four noted conditions are: 1) the filtered input is greater than a yaw threshold (i.e., the filtered input exceeds the yaw threshold); 2) the oscillation amplitude is greater than a calibratable threshold; 3) the driver steering input is not to the left; and 4) the previous (immediately preceding) oscillation direction of the trailer is not to the left.

The yaw threshold against which the respective filtered inputs are measured can vary and is preferably set at a value which indicates that the oscillation or yaw is at a level which warrants further consideration from the standpoint of determining whether sway reduction through active control may be required. In the disclosed embodiment, the yaw threshold N1 for each of the filtered inputs is set at +5 degrees (oscillation or sway to the left being represented in the disclosed embodiment by a positive angle and oscillation or sway to the right being represented by a negative angle).

The oscillation amplitude which is compared to the calibratable threshold is determined by considering the oscillation amplitude of the current oscillation relative to the previous oscillation. For example, the first time an oscillation is found to exist, this oscillation is compared to zero so that if the vehicle is swaying to the left by 8 degrees, the oscillation amplitude is 8 degrees. If this is followed by an oscillation to the right of 8 degrees, the oscillation amplitude will be determined to be 16 degrees (the current oscillation of −8 degrees relative to the prior oscillation of +8 degrees). The oscillation amplitude is compared to a calibratable threshold which can be set at an appropriate level depending upon, for example, the desires and/or requirements of a particular vehicle or manufacturer. In the disclosed embodiment, a calibratable threshold N2 of 10 deg/s is used for each of the filtered inputs.

The driver steering input may be determined based on the output from the steering angle sensor SA. The reason for considering the driver steer input (i.e., whether the driver steer input is to the left) is to ascertain whether detected oscillation is a driver induced oscillation (i.e., if detected oscillation to the left results from a driver induced steer input to the left).

The determination of the oscillation direction of the vehicle, for purposes of ascertaining whether or not the previous oscillation is to the left, may be determined based on the outputs of the lateral acceleration sensor GY, the yaw rate sensor YR and the yaw rate deviation.

If Condition #1 is determined to be true at S240 (i.e., all four of the noted conditions are satisfied), the routine proceeds to S250 where the oscillation direction is set as left, an oscillation counter is incremented as appropriate, and the oscillation timer (which times the duration of oscillations) are cleared. The system preferably includes an oscillation counter associated with each of the filtered inputs (i.e., a yaw (Yr) oscillation counter which counts the oscillations associated with the filtered yaw rate from the yaw rate sensor YR, a yaw (Gy) oscillation counter which counts the oscillations associated with the filtered yaw rate or lateral acceleration from the lateral acceleration sensor GY, and a yaw deviation oscillation counter which counts the oscillations associated with the filtered yaw rate deviation), with the appropriate oscillation counter being incremented depending on the filtered input being analyzed. Following S250, the routine continues to S280.

On the other hand, if it is determined at S240 that Condition #1 is not true (i.e., at least one of the four noted conditions for Condition #1 is not satisfied), the process proceeds to S260 where it is determined if Condition #2 is satisfied. That is, as shown in the middle left portion of FIG. 4, Condition #2 is determined to be true (S260: Yes) when all four of the noted conditions are satisfied. The four noted conditions are: 1) the filtered input is less than the yaw threshold (i.e., the filtered input exceeds the yaw threshold); 2) the oscillation amplitude is greater than a calibratable threshold; 3) the driver steering input is not to the right; and 4) the previous (immediately preceding) oscillation direction of the trailer is not to the right.

Once again, the yaw threshold against which the filtered input is measured in Condition #2 can vary and is preferably set at a value which indicates that the oscillation or yaw is at a level which warrants further consideration from the standpoint of determining whether sway or oscillation reduction through active control may be required. In the disclosed embodiment, the yaw threshold N5 for Condition #2 is set at −5 degrees.

Also, consistent with the above description of Condition #1, the oscillation amplitude which is compared to the calibratable threshold is determined by considering the oscillation amplitude of the current oscillation of the filtered input being analyzed relative to the previous oscillation. The oscillation amplitude is compared to a calibratable threshold which can be set at an appropriate level. In the disclosed embodiment, a calibratable threshold N2 of 10 deg/s is used for each of the filtered inputs.

The driver steering input in Condition #2 may be determined based on the output from the steering angle sensor SA to ascertain whether detected oscillation is a driver induced oscillation (i.e., if detected oscillation to the right results from a driver induced steer input to the right).

Also, as discussed above with respect to Condition #1, the determination of the oscillation direction of the vehicle, for purposes of ascertaining whether or not the previous oscillation is to the right, may be determined based on the outputs of the lateral acceleration sensor GY, the yaw rate sensor YR and the yaw rate deviation.

If Condition #2 is determined to be true at S260 (i.e., all four of the noted conditions are satisfied), the routine proceeds to S270 where the oscillation direction is set as right, the oscillation counter is incremented as appropriate, and the oscillation timer is cleared. The routine then continues to S280.

If it is determined that Condition #2 is not true at S260 (i.e., at least one of the four noted conditions for Condition #2 is not satisfied), the process proceeds to S280.

At S280, it is determined whether Condition #3 is true. That is, as noted in the lower left hand portion of FIG. 4, Condition #3 is determined to be true when at least one of the two noted conditions is satisfied. The two noted conditions are: 1) the vehicle speed is less than a permission or permissible vehicle speed; and 2) the oscillation timer is greater than the calibratable time. When the vehicle is traveling at a relatively slow speed, oscillations which may be present are not of significant concern. The permission or permissible vehicle speed can be set at a desired level depending on, for example, the desired threshold or sensitivity at which sway is to be addressed. In the disclosed embodiment, this permission or permissible vehicle speed N3 is set at 50 km/hr.

If the oscillation timer for the filtered input being considered is determined at S280 to be greater than a calibratable timeout N4 which, in the disclosed embodiment is set at 5 seconds, it is determined that Condition #1 and Condition #2 have not been satisfied for the calibratable timeout period.

If it is determined that Condition #3 is true (i.e., at least one of the two noted conditions for Condition #3 is satisfied), the process proceeds to S290 where the oscillation direction is determined to be neither left nor right, and the oscillation counter is cleared. From S290, the routine proceeds to the sway/oscillation enter/exit control logic S300 which is shown in more detail in FIG. 5. On the other hand, if at least one of the two noted conditions for Condition #3 is not satisfied (i.e., the vehicle speed is greater than the permission speed N3 and the oscillation timer is less than the calibratable timeout N4) at S280, the process proceeds from S280 to S300.

Thus, Condition #1 and Condition # 2 in S240 and S260 respectively identify situations in which yaw or oscillation have been detected and where the oscillation or yaw is at a level which warrants further consideration from the standpoint of determining whether sway or oscillation reduction through active control may be required. Condition #1 at S240 determines the existence of such yaw or oscillation to the left, while Condition #2 at S260 determines the existence of such yaw or oscillation to the right. If Condition #1 or Condition #2 is satisfied, it is then determined in S280 whether the vehicle speed is less than the permission speed. If so, it is considered that the oscillation or yaw is not of significant concern due to the low vehicle speed, and the oscillation direction is set at zero. If neither Condition #1 nor Condition #2 is satisfied, and it is determined at S280 that the vehicle speed is less than the permission speed N3 or the oscillation timer is greater than the calibratable timeout N4, the oscillation direction is also set to zero.

Referring to FIG. 5, the enter/exit control logic begins at S310 with a determination whether Condition #4 is true. That is, as shown in the upper left portion of FIG. 5, Condition #4 is determined to be true (S310: Yes) when all six of the noted conditions are satisfied. The six noted conditions are: 1) the vehicle speed is greater than the permission (permissible) speed N3; 2) the yaw (Yr) oscillation counter is greater than an entrance value; 3) the yaw (Gy) oscillation counter is greater than an entrance value; 4) the yaw deviation oscillation counter is greater than an entrance value; 5) the driver steering input is less than an entrance value; and 6) the brake is off, meaning that the driver is not pressing on the brake pedal.

In the disclosed embodiment, the entrance values X1 against which the yaw (Yr) oscillation counter, the yaw (Gy) oscillation counter and the yaw deviation oscillation counter are compared are the same and are indicated as three counts. In this regard, it is to be understood that in this disclosed embodiment, one count refers to one oscillation. Thus, three counts refers to three oscillations, meaning an oscillation in one direction (e.g., to the left), an oscillation in the opposite direction (e.g., to the right) and an oscillation back to the one direction (e.g., to the left). Of course, other entrance values can be used, and each of the oscillation counters (the yaw (Yr) oscillation counter, the yaw (Gy) oscillation counter and the yaw deviation oscillation counter) can be compared against different entrance values.

In the disclosed embodiment, the entrance value X2 against which the driver steering input is measured is 50 deg., although other values can be used if desired. Also, the determination of whether the brake is off (whether the driver is pressing the brake pedal) can be determined in a known manner, for example through a sensor which detects operation of the brake pedal.

If it is determined in S310 that Condition #4 is true (i.e., that all six of the noted conditions are satisfied), it is determined that sway reduction is required to reduce sway, for example sway or oscillation associated with a trailer. The sway reduction reduces the sway in the vehicle, thus also reducing sway in the trailer. Thus, the process proceeds to S320 at which sway reduction (trailer sway reduction, TSR, in this embodiment), for example a sway reduction switch, is turned ON, whereupon the process proceeds to S330 at which the sway brake and engine control is performed as described in more detail with reference to FIG. 6.

At S310, if it is determined that Condition #4 is not true (i.e., if at least one of the six noted conditions is not satisfied), the routine proceeds to S340 where it is determined if Condition #5 is true. That is, as shown in the lower left portion of FIG. 5, Condition #5 is determined to be true (S340: Yes) when at least one of the five noted conditions are satisfied. The five noted conditions are: 1) the vehicle speed is less than the permission speed; 2) the yaw (Yr) oscillation timer is greater than an oscillation timeout; 3) the yaw (Gy) oscillation timer is greater than an oscillation timeout; 4) the driver steering input is greater than the entrance value; and 5) the brake is on, meaning that the driver is pressing on the brake pedal.

In this disclosed embodiment, the oscillation timeout (N4) against which the yaw (Yr) oscillation timer and the yaw (Gy) oscillation timer are compared is the same and is, by way of example, 5 seconds. Of course, other oscillation timeout values can be used, and the yaw (Yr) oscillation timer and the yaw (Gy) oscillation timer can be compared against different oscillation timeout values rather than the same timeout value.

If it is determined that Condition #5 is true (i.e., if at least one of the five noted conditions is satisfied), the process proceeds to S350 at which the sway reduction (TSR) is turned OFF. Thereafter, the process proceeds to S330. Also, following a determination in S340 that Condition #5 is not true (i.e., none of the five noted conditions for Condition #5 is satisfied), the process proceeds to S330.

The sway brake and engine control noted at S330 in FIG. 5 is carried out according to the process or routine shown in FIG. 6. The process begins at S400 where it is determined whether or not the trailer sway reduction (TSR) is ON. If the trailer sway reduction is not on, no brake control request and no engine torque control request are sent as noted at S410 and S420.

On the other hand, if the trailer sway reduction (TSR) is ON, the routine proceeds to S430 at which is calculated a target wheel pressure based on the vehicle speed. For example, if the vehicle is traveling at 100 km/hr, a relatively larger target wheel pressure could be calculated as compared to if the vehicle is traveling at 60 km/hr. Next, at S440, a suitable brake pressure distribution between the front and left wheels is calculated, followed by calculation of the pressure distribution between the inner and outer wheels at S450. The brake pressure distribution to the front and rear wheels and the brake pressure distribution to the inner and outer wheels can be calculated in a manner similar to that used in automatic stability control systems for purposes of counteracting yaw.

Next, at S460, the brake pressure is compensated based on the yaw rate and the road surface coefficient of friction (u). Once again, this can be done in a manner similar to that used in automatic stability control systems for counteracting yaw. Thereafter, the respective wheel brakes are activated in S470 according to the determined pressures to reduce the vehicle speed and sway, including trailer sway. That is, a request is sent from the vehicle sway detection/reduction ECU3 to the brake system ECU1 to apply the brakes to the individual wheels of the vehicle 101 according to the calculated brake pressures. Then, at S480, an engine torque reduction is calculated based on the yaw rate and the road surface coefficient of friction (μ). The engine torque reduction can be calculated in a manner similar to that used in automatic stability control systems for counteracting yaw. Following S480, the calculated engine torque reduction is carried out at S490. That is, the vehicle sway detection/reduction ECU3 sends a request to the engine system ECU2 to perform a torque reduction according to the calculated engine torque reduction.

As mentioned, the sway detection and reduction processes described above have useful application where a towing vehicle gets into a lateral periodic oscillation caused by an attached swaying trailer. In order to detect if the vehicle is in a lateral oscillatory state, the yaw rate sensor, lateral acceleration sensor and longitudinal acceleration sensor are provided to detect the oscillations.

The trailer sway reduction process according to the embodiment disclosed here reduces the engine torque and applies brake pressure to stop and/or lessen the severity of the oscillations of the towing vehicle due to the swaying trailer. When the lateral oscillations of the towing vehicle are detected and required to be addressed, the vehicle sway detection/reduction ECU3 sends a message to the engine system ECU2 to reduce the engine torque and the vehicle sway detection/reduction ECU3 also sends a command to the brake system ECU1 to independently control the brake pressure applied to each of the four wheels of the towing vehicle.

False detection of vehicle sway (e.g., associated with trailer sway) is avoided by monitoring the driver's steering intention as indicated by the steering sensor angle input values. Oscillation amplitudes are stored and frequency times are checked against software timers stored in the vehicle sway detection/reduction ECU3. The calibratable threshold values for the oscillation amplitude and the frequency times are used for proper sway detection. That is, the frequency of occurrence of the oscillations (the number of times the oscillations are occurring) and the time period over which such oscillations occur are used for proper sway detection.

When sway detection occurs, brake pressures BPfr, BPfl, BPrr, BPrl are preferably induced on all four wheels of the vehicle 101 and the brake pressures are determined by vehicle speed, surface friction, and vehicle yaw. The brake pressure is stronger on the outside wheels of the vehicle in the direction of the vehicle's yaw moment. For example, the brake pressure BPfr is the greatest at the outside front wheel WHfr, as shown in FIG. 7, so that the generated vehicle force VF from brake pressure counteracts the sway force/moment SF generated by the trailer 102 to reduce the sway of the vehicle 101 and the trailer 102. The vehicle force VF generated from the brake pressure also slows the vehicle 101, which reduces sway. Thus, brake input from the vehicle counteracts the sway moment generated by the trailer and reduces vehicle and trailer sway. The brake pressure also slows the vehicle which reduces sway.

The sway reduction control process preferably exits or ends when one or more of the following conditions occurs: 1) vehicle oscillation returns to normal; 2) vehicle speed falls below a permission or permissible speed (e.g., 50 km/h (kph); 3) the driver counter-steers more than an entrance value (e.g., 50 degrees) a plurality of times; and 4) the driver depresses the brake pedal with sufficient force.

The processes described above may be initiated automatically upon starting of the vehicle, or they may be initiated manually by the application of a switch, such as a switch operated by the driver or a switch that is activated when a trailer is operatively connected to the vehicle for towing.

It should be appreciated that although the embodiments described above include a vehicle having four wheels, the present invention is applicable to vehicles having any number of wheels. It should also be appreciated that although the invention has been described with reference to a trailer, the invention is applicable to situations in which a first vehicle tows a second vehicle, and in other situations in which detection of vehicle sway, and subsequent control and reduction of sway if necessary, are desirable.

Although the invention has been described above with reference to the disclosed embodiments, it should be appreciated that various modifications may be apparent to those of ordinary skill in the art without departing from the spirit and scope of the invention as defined in the claims attached hereto.

What is claimed is:

1. A method of controlling a vehicle towing a trailer, comprising:
   determining if a sway force is exerted on the vehicle by the trailer, the determining if a sway force is exerted on the vehicle by the trailer comprising:
     generating signals indicative of a vehicle yaw rate;
     filtering the signals of the vehicle yaw rate to obtain values of an actual yaw rate;
     determining for a predetermined time an oscillation direction of the vehicle using frequency and amplitude values of the actual yaw rate;
     determining if a vehicle speed of the vehicle is greater than a predetermined speed;
     determining if a steering wheel angle is opposite the determined oscillation direction; and
     determining that values of the actual yaw rate are greater than threshold values; and
   if it is determined that the sway force is exerted on the vehicle, reducing a torque of an engine of the vehicle and applying independent braking forces to each wheel of the vehicle to reduce the sway.

2. A method according to claim 1, wherein the engine torque reduction and independent braking force application are ceased if the vehicle speed is less than a predetermined vehicle speed, the vehicle yaw rate is less than a predetermined yaw rate, the deviation of the vehicle yaw rate is less than a predetermined vehicle yaw rate deviation, the steering wheel angle is greater than a predetermined steering wheel angle, or a brake pedal of the vehicle is depressed an amount sufficient to generate a braking force greater than a predetermined braking force.

3. A method according to claim 1, wherein the engine torque reduction and independent braking force application are ceased if a swaying force is determined not to be exerted on the vehicle.

4. A method according to claim 1, wherein the threshold values are calibratable.

5. A method of detecting sway in a vehicle having an engine and wheels for purposes of determining whether to implement sway control, with torque of the engine being reduced and independent braking force being applied to each of the wheels of the vehicle to reduce the sway when the sway is detected, the method of detecting sway comprising:
   determining an actual yaw rate of the vehicle;
   determining an oscillation direction of the vehicle for a predetermined time using frequency and amplitude values of the actual yaw rate;
   comparing the actual yaw rate to a first threshold;
   comparing the oscillation amplitude to a second threshold;
   determining a driver steering input; and
   determining that the vehicle is oscillating in one direction when the actual yaw rate exceeds the first threshold, the oscillation amplitude exceeds the second threshold, the driver steering input is not in said one direction and an immediately preceding oscillation direction is not in the one direction.

6. A method according to claim 5, further comprising comparing a speed of the vehicle to a permissible speed, and determining that sway control is not necessary even if the vehicle is determined to be oscillating when the speed of the vehicle is less than a permissible speed.

7. A vehicle, comprising:
   an engine;
   a plurality of wheels;
   a braking system configured to apply independent braking forces to each wheel; and
   a controller configured to control the engine and the braking system, the controller being configured to
     determine if the vehicle is swaying by
       receiving signals indicative of a vehicle speed, a vehicle yaw rate, and a steering wheel angle;
       filtering the signals of the vehicle yaw rate to obtain an actual yaw rate;
       determining an oscillation direction of the vehicle for a predetermined time;
       determining if the vehicle speed is greater than a predetermined speed;
       determining if the steering wheel angle is opposite the oscillation direction; and
       determining that values of the filtered signals and deviations of the values of the filtered signals are greater than threshold values; and
     if it is determined that the vehicle is swaying, reduce a torque of the engine and apply independent braking forces to each wheel.

8. A vehicle according to claim 7, wherein the controller ceases engine torque reduction and independent braking force application if the vehicle speed is less than a predetermined vehicle speed, the vehicle yaw rate is less than a predetermined yaw rate, the deviation of the vehicle yaw rate is less than a predetermined vehicle yaw rate deviation, the steering wheel angle is greater than a predetermined steering wheel angle, or a brake pedal of the vehicle is depressed an amount sufficient to generate a braking force greater than a predetermined braking force.

9. A vehicle according to claim 7, wherein the controller ceases engine torque reduction and independent braking force application if a swaying force is determined not to be exerted on the vehicle.

10. A vehicle according to claim 7, wherein the threshold values are calibratable.

\* \* \* \* \*